Sept. 27, 1955    E. LONG    2,718,739
LAWN MAINTENANCE EQUIPMENT
Original Filed March 18, 1950    2 Sheets-Sheet 1

INVENTOR
EARL LONG

BY *Hans G. Hoffmeister*
ATTORNEY

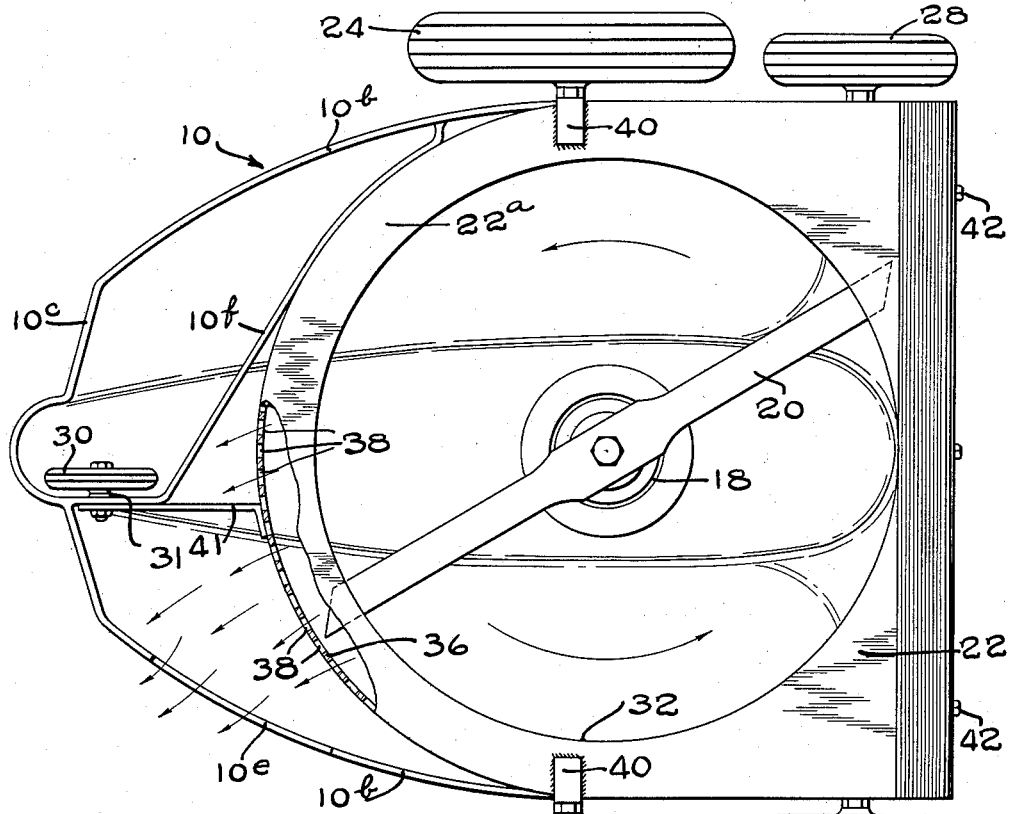
FIG_3
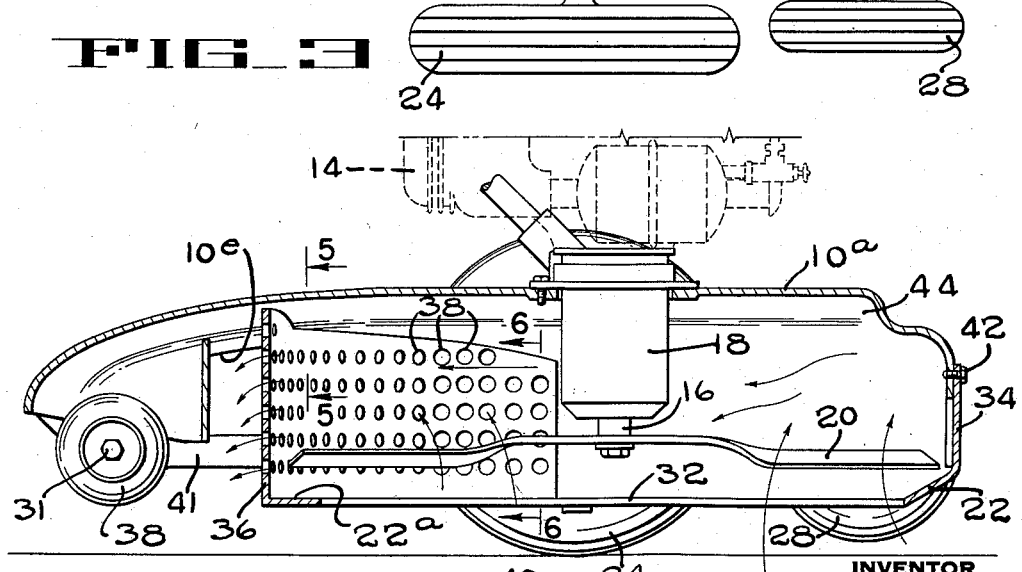
FIG_4

United States Patent Office 2,718,739
Patented Sept. 27, 1955

2,718,739

LAWN MAINTENANCE EQUIPMENT

Earl Long, Kansas City, Kans., assignor, by mesne assignments, to Food Machinery and Chemical Corporation, San Jose, Calif., a corporation of Delaware Continuation of application Serial No. 150,391, March 18, 1950. This application July 14, 1954, Serial No. 443,240

15 Claims. (Cl. 55—62)

The present application is a continuation of my copending application entitled "Lawn Maintenance Equipment," Serial No. 150,391, filed March 18, 1950 now abandoned.

This invention relates broadly to lawn maintenance equipment and it refers more particularly to a lawn machine designed to pick up fallen leaves, cut grass and like material, pulverize them and return the disintegrated mass to the lawn as a mulch.

One of the problems most frequently encountered in lawn maintenance is the disposal, after mowing, of the cut grass, and, where trees are found, the fallen leaves which may cover the lawn. While raking will rid the area of the cut grass and leaves, it often is a tedious and time-consuming job; moreover, it results in the loss of a natural nutrient for the lawn, for it is well-known that decayed leaves and grass constitute a fine fertilizer.

The object of my invention broadly speaking is to provide a simple, trouble-free and relatively inexpensive machine that may be propelled easily over the lawn and which will pick up the fallen leaves, grass, etc., in its path, comminute or pulverize them and return them to the lawn as fine particles for purposes of fertilization.

Another object of the invention is to provide a machine of the foregoing character which may also be used to cut standing grass either as a separate operation or in connection with the pulverizing operation.

A salient feature of my invention resides in providing a wheeled housing having therein a rapidly rotating blade serving both as a suction fan to lift fallen leaves, etc., into the housing and also as a knife or flail to disintegrate them within the housing.

Another object is to provide in a lawn maintenance machine a novel housing having a grading screen through which comminuted material may be expelled and having means for effecting a recirculation, through the cutting zone, of air currents and material entrained therein.

A further object resides in the provision of a machine of the character indicated which is easily maneuverable at turns, which may be employed satisfactorily on smooth or rough terrain, and which, in redistributing either cut grass or distintegrated leaf and grass particles, directs them out of the path of travel of the machine and away from the operator.

Still another object of my invention is to provide for use in connection with a power driven rotary type lawn mower a leaf and grass grinding or pulverizing attachment which will function during the normal operation of the mower and which is easily assembled and disassembled as an integral part of the mower.

Other objects and features of the invention will appear in the course of the following description.

In the accompanying drawings which form a part of the specification and are to be read in conjunction therewith, and in which like reference numerals are employed to identify like parts of the various views:

Fig. 3 is a bottom view of the machine with parts broken away and shown in section for purposes of illustration.

Fig. 4 is a side elevational view of the device shown in Figure 3 with parts broken away and shown in section.

Figure 1:
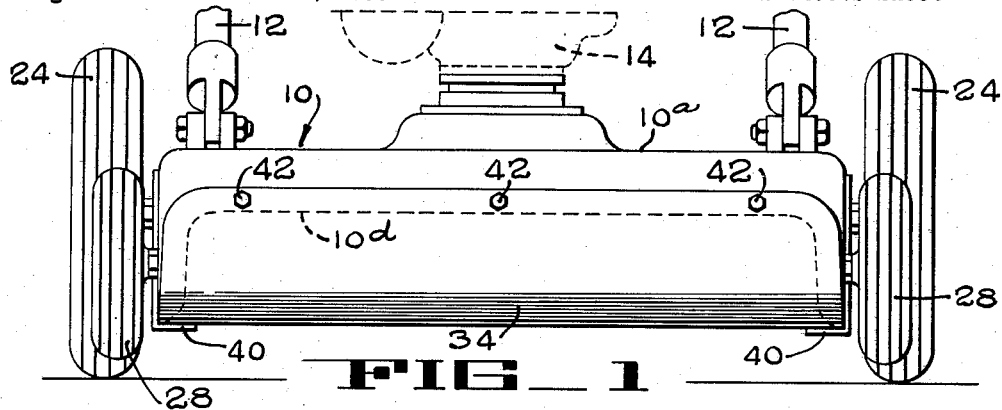
Fig. 1 is a fragmentary front elevational view of a lawn maintenance machine embodying the invention.

Referring more particularly to the drawings, the numeral 10 designates a wheeled carriage or housing adapted to be pushed along the ground by means of an upwardly and rearwardly inclined handle 12, the lower portion of the handle being bifurcated and hingedly connected at its ends to the housing.

The housing proper comprises a rigid metal shell, shaped as shown, forming a generally horizontal platform 10a with integral flanges or skirts 10b depending from its opposite lateral edges and merging with similar skirting 10c on the rear. A small internal combustion engine or other suitable prime mover 14 is mounted centrally on the platform; its drive shaft 16 projects vertically downward through a bearing collar 18 and has secured to its lowermost end a sharpened blade 20 which therefore rotates in a horizontal orbit as the shaft turns.

In the drawings, a shroud 22 is shown attached to the housing and completing the enclosure of the blade, but this preferably is omitted when the machine is to be used for mowing grass. Thus, in mowing, the standing grass enters the housing through the forward opening 10d as the mower is propelled along the ground; within the housing it encounters the rapidly rotating blade 20, is cut, and the cut grass is projected from the housing through a wide slot or opening 10e in one side skirt. A vertical baffle 10f extending diagonally across the rear interior portion of the housing assists in directing the cut grass through this opening.

Figure 2:
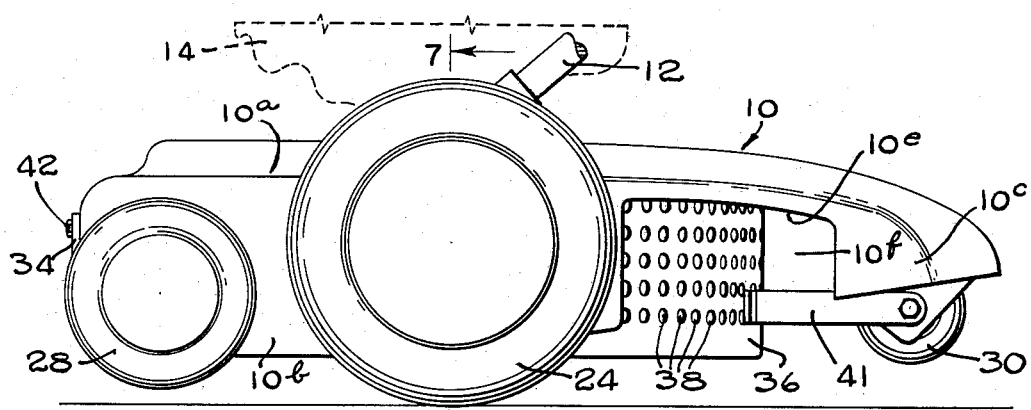
Fig. 2 is a fragmentary side elevational view of the machine.

It will be noted that the housing was five ground wheels. The main weight-supporting wheels 24, larger than the others, are located centrally on either side and are rotatably mounted on trunnion stubs 26, the latter being threaded into tapped holes in the side skirts 10b and secured by lock nuts 27. The forward wheels 28 are similarly mounted in the side skirts, while the trail wheel 30 is rotatably supported on a stub shaft 31 secured to the baffle 10f. As will be clear from Fig. 2 the ground engaging portions of the main wheels 24 are relatively lower than the corresponding portions of the other wheels so the carriage ordinarily travels on these wheels alone, making it easy to maneuver the carriage at turns. Even when the carriage tips slightly forward or backward, the weight on the front or rear wheels, as the case may be, is sufficiently light that maneuverability is not impaired. At the same time the forward and rear wheels are important in maintaining the carriage level when, for example, the main wheels drop into a hollow in the course of propelling the mower over rough terrain.

Figure 5:
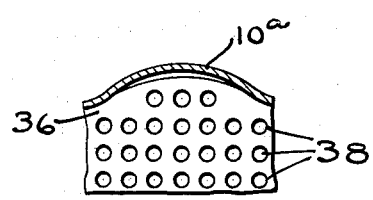
Fig. 5 is a fragmentary cross-sectional view taken along the line 5—5 of Fig. 4.
Figure 7:
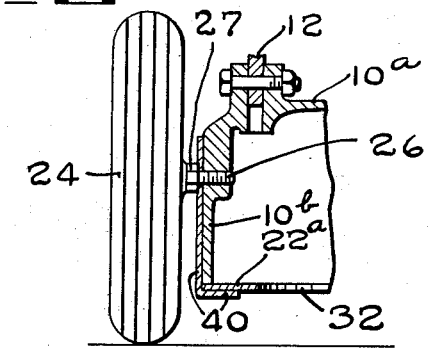
Fig. 7 is a cross sectional view taken along the line 7—7 of Fig. 2 in the direction of the arrows.
Figure 6:
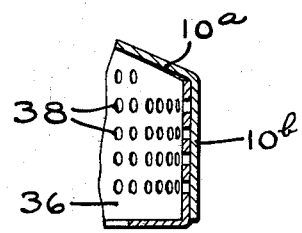
Fig. 6 is a fragmentary cross-sectional view taken along the line 6—6 of Fig. 4.

As previously indicated, an important feature of my invention resides in the provision of shroud 22 which is attachable to the main housing for the purpose of converting the mower into a leaf and grass pulverizing unit. The shroud comprises a flat plate spanning the open bottom of the housing from side to side and having a large central opening 32 concentric with the axis of shaft 16. The forward edge of the shroud is bent upwardly as shown at 34 to cover the opening 10d; and the rear edge has an upstanding, semi-circular flange or rim 36, the top margin of which conforms rather closely to the contour of the underside of the housing so there are no large gaps therebetween (see Figs. 5 and 6). Flange 36 has a number of perforations 38 by virtue of which it forms a grading screen or grid whose purpose will be made clear presently.

The shroud can be attached to the housing in any desired fashion. Conveniently, for example, it may be provided with welded on brackets 40 and 41, the brackets 40 being arranged to extend upwardly along the outside of the housing and having apertures to receive the trunnion stubs 26, while the bracket 41 extends rearwardly and has a similar aperture to receive the stub shaft 31. Thus, to mount the shroud it is necessary only to loosen the wheel mountings in question, insert the brackets and retighten the mountings. The forward edge of the shroud can be secured by screws 42 as shown in Fig. 1.

When in place the shroud forms, with the housing, a substantially complete enclosure for the rotating blade 20, the only openings in the enclosure being the large central opening 32 in the bottom and the small perforations 38 in the rear semi-circular rim 36. Blade 20 is slightly longer than the diameter of the opening 32 so its tips overhang the narrow horizontal ledge 22a encircling the opening; and it will be seen that through most of their rotation, these tips travel close to the vertical walls defining the sides of the enclosure.

The opposite halves of the blade are pitched, the pitch being sufficiently pronounced that upon rotation of the blade in the direction of the arrows (Fig. 3) a strong updraft through opening 32 is created. This sucks fallen leaves, cut grass and similar material, upwardly into the compartment 44 as the machine is pushed over the lawn. Upon entering, such material is flung outwardly due to centrifugal force and, consequently, is trapped in the enclosure by the lip or ledge 22a while the rapidly rotating blade comminutes, macerates and pulverizes it to sufficiently fine condition that the particles will be carried or blown through the perforations 38 by the exhaust air stream. The course of the particles is indicated by arrows in Figs. 3 and 4. In addition to the air stream that carries the comminuted particles through the perforations 38, currents of air are directed downwardly along the inner surfaces of the vertical walls which define the compartment 44. When these air currents reach the ledge 22a, they are directed inwardly by the ledge 22a into the substantially central updraft of air generated by the rotating blade 20. In this manner, particles of material trapped by the ledge 22a are redirected by the ledge into the suction air stream and into the cutting path of the blade 20. Since the downwardly directed air currents are guided inwardly, leaves and cut grass on the ground will not be blown away from the machine but will be allowed to remain at rest until drawn up by the central updraft of suction air.

The size of the perforations 38 may be varied in accordance with the fineness to which it is desired to reduce the particles, but it has been found in practice that openings ½ inch in diameter produce very satisfactory results. It also should be understood that the machine may be employed for cutting grass while the shroud 22 is in place, the suction created by the blade serving to lift the grass into the path of the blade so that the grass is cut and pulverized in a single operation. In general, however, it is preferred to remove the shroud for the grass cutting operation as previously suggested.

Thus it will be seen that I have provided a lawn maintenance machine which may be used, not only to mow the grass but also to convert fallen leaves, grass and like material to a pulverulent mulch which is redistributed over the lawn. Although the invention has been described in connection with an easily mountable and demountable attachment for the particular type of rotary mower shown, it should be understood that the assembly may be permanent. Also it will be readily apparent to those versed in the art that the invention can be satisfactorily adapted to other designs of conventional rotary lawn mowers, the details of the mower shown being merely exemplary.

From the foregoing it will be seen that this invention is one well adapted to attain all of the ends and objects hereinbefore set forth together with other advantages which are obvious and which are inherent to the apparatus.

It will be understood that certain features and subcombinations are of utility and may be employed without reference to other features and sub-combinations. This is contemplated by and is within the scope of the claims.

Inasmuch as various modifications of the invention may be made without departing from the scope thereof, it is to be understood that all matter herein set forth or shown in the accompanying drawings is to be interpreted as illustrative and not in a limiting sense.

I claim:

1. A lawn maintenance machine comprising an inverted, cup-shaped housing having in one wall section thereof a plurality of small openings forming a grading screen, support means on the housing resting on the ground and holding the lower margin of the housing spaced slightly above the ground, means for propelling the housing along the ground while it is thus supported, a horizontal fan blade in said housing, a prime mover carried by the housing and connected to said blade to rotate same about a vertical axis thereby to create an updraft of air into the housing, and an annular lip projecting inwardly from the side walls of the housing below the level of said blade to trap the light material drawn into the housing by said updraft, whereby said material is comminuted by said blade to a particle size which may pass through said grading screen.

2. A lawn maintenance machine comprising an inverted, cup-shaped housing having in one wall section thereof a plurality of small openings forming a grading screen, support means on the housing resting on the ground and holding the lower margin of the housing spaced slightly above the ground, means for propelling the housing along the ground while it is thus supported, a horizontal fan blade in said housing, a prime mover carried by the housing and connected to said blade to rotate same about a vertical axis thereby to create an updraft of air into the housing, and a horizontal flange projecting inwardly from the lower rim of said housing and forming an annulus underlying the tips of said blade to trap the light material drawn into the housing by said updraft, whereby said material is comminuted by said blade to a particle size which may pass through said grading screen.

3. A lawn machine of the character described comprising a wheeled carriage, a power operated fan on the carriage having a fan blade spaced above the ground and rotated about a substantially vertical axis, said carriage including a housing about said blade having a top wall above the blade, a bottom wall below the blade and side walls closely circumscribing the path traveled by the tips of the blades, the housing having air inlet and outlet openings for the fan blade, the inlet opening being in the bottom wall and comprising a circular aperture substantially concentric with the blade's axis of rotation, the diameter of said aperture being slightly less than the diameter of the circle described by the outermost tip of the blade, and barrier means limiting the size of air borne particles that may leave the housing via said outlet.

4. A lawn machine of the character described comprising a wheeled carriage, a power operated fan on said carriage having a fan blade spaced above the ground and rotated above a vertical axis, said carriage including a housing about said blade having a substantially imperforate top wall above the blade, a bottom wall below the blade and side walls closely circumscribing the path traveled by the tips of the blade, at least some of the side wall of the housing being horizontally curved to lie along a circle concentric with the blade's axis of rotation, the bottom wall having a relatively large central opening, the margin of which is spaced inwardly from the side walls, said fan blade being pitched to create an updraft of air through said opening, and the side wall of the housing having a plurality of relatively small openings to permit escape of air from the housing but blocking passage of air borne particles larger than a predetermined size.

5. In combination with a rotary lawn mower of the type comprising a wheeled platform carrying a prime mover and having a horizontally rotating cutter blade below the platform driven by the prime mover, said blade being pitched to create an updraft of air as it rotates; a shroud detachably mounted on the mower and forming with the platform a housing enclosing the blade on the top and all sides with a generally horizontal flange extending inwardly from the sides below the blade but leaving a relatively large opening directly below the blade, said housing having relatively small perforations for egress of material drawn upwardly into the housing and comminuted by said blade.

6. In combination with a rotary lawn mower of the type comprising a wheeled platform carrying a prime mover and having a horizontally rotating cutter blade below the platform driven by the prime mover, said platform having on its lateral edges depending flanges shielding the sides of the blade and said blade being pitched to create an updraft of air between said flanges as it rotates; the improvement which comprises a horizontal shroud below the blade spanning the space between the lower edges of said flanges, said shroud having integral upturned forward and rear flanges forming with said first flanges a wall circumscribing the orbit of the cutter blade and substantially closing the vertical space between the platform and shroud, said shroud having a relatively large air intake opening below said blade and at least one of said flanges having a plurality of smaller outlet openings.

7. A combination as in claim 6 wherein at least one of the flanges on said shroud is horizontally curved to conform with the path traveled by the tip of the rotating blade, said one flange being located just outside of said path.

8. A lawn maintenance machine of the character described, comprising a wheeled carriage having means for propelling same along the ground, a fan blade rotatably mounted on said carriage to turn about a vertical axis, said blade being spaced above the ground, said carriage including a housing about the blade having a top wall above the blade and side walls completely circumscribing the path traveled by the tips of the blade, said housing having in one wall section thereof a plurality of small openings forming a grading screen, a prime mover on said carriage connected to said blade to rotate same about said vertical axis thereby to create an updraft of air into the housing and a discharge of air through said grading screen, and a curved horizontal lip substantially concentric with said vertical axis projecting inwardly from the side walls of the housing below the level of said blade to trap the light material drawn into the housing by said updraft whereby said material is comminuted by said blade to a particle size which may pass through said grading screen.

9. A lawn maintenance machine of the character described, comprising a wheeled carriage, a power-operated fan on said carriage having a fan blade spaced above the ground and rotatable about a vertical axis, said carriage including a housing about said blade having a top wall above the blade, a bottom wall below the level of the blade, and side walls closely circumscribing the path traveled by the tips of the blade, at least a portion of the side walls of the housing being horizontally curved to lie along a circle concentric with the blade's axis of rotation, the bottom wall having a relatively large central opening, the margin of which is spaced inwardly from the side walls, said fan blade being constructed and arranged to create an updraft of air through said opening, and a side wall of the housing having a plurality of relatively small openings to permit escape of air from the housing but blocking passage of airborne particles larger than a predetermined size.

10. A lawn maintenance machine of the character described, comprising a wheeled carriage, a power-operated fan on said carriage having a fan blade spaced above the ground and rotated about a vertical axis, said carriage including a housing about said blade having a top wall above the blade and a side wall closely circumscribing the path traveled by the tips of the blade, at least a portion of the side wall of the housing being horizontally curved to lie along a circle concentric with the blade's axis of rotation, said portion carrying a substantially horizontal lip projecting inwardly therefrom below the level of said blade, the fan blade being constructed and arranged to create an updraft of air into said housing, and the side wall of the housing having a plurality of relatively small openings to permit escape of air from the housing but blocking passage of airborne particles larger than a predetermined size.

11. In combination with a rotary lawn mower of the type comprising a wheeled platform carrying a prime mover having a vertical drive shaft, a generally horizontal blade below the platform connected to said drive shaft for rotation thereby, said blade being constructed and arranged to create an updraft of air as it rotates, shroud means detachably mounted on the mower and forming with the platform a housing enclosing the blade on the top and all sides with a generally horizontal flange extending inwardly from a side of the housing below the level of the blade but leaving a relatively large opening centrally of said housing directly below the blade, said housing having relatively small perforations for egress of material drawn upwardly into the housing and comminuted by said blade.

12. In a lawn maintenance machine the combination of a housing having a top wall and a generally vertical wall projecting downwardly from said top wall, means for holding the lower margin of said vertical wall spaced slightly above the ground, a cutting blade mounted for rotation about a substantially vertical axis inside said housing with said vertical housing wall closely encompassing the path of travel of the tip of said cutting blade, means for rotating said blade, said blade having a configuration adapted upon rotation of said blade to cause an updraft of air into the housing to draw material to be comminuted into the housing and into the cutting zone of said blade, said housing having in one wall thereof a plurality of openings forming a grading section, and means associated with said housing for intercepting descending air currents formed within said housing and redirecting said currents and material carried thereby into said updraft of air for re-entry into the cutting zone of the blade.

13. In a lawn maintenance machine, the combination of a housing having a top wall and a generally vertical wall projecting downwardly from said top wall, means for holding the lower margin of said vertical wall spaced slightly above the ground, a cutting blade mounted for rotation about a substantially vertical axis inside said housing with said vertical housing wall closely encompassing the path of travel of the tip of said cutting blade, means for rotating said blade, said blade having a configuration adapted upon rotation of said blade to cause an updraft of air into the housing to draw material to be comminuted into the housing and into the cutting zone of said blade, said housing having in one wall thereof a plurality of openings forming a grading section, and a horizontally disposed air deflector carried by said housing adjacent a marginal edge portion of said vertical housing wall and projecting inwardly toward said axis of rotation of said blade, said deflector being positioned to intercept currents of air directed downwardly in said housing and to guide said currents and material carried thereby toward and into said updraft of air for re-entry into the cutting zone of the blade.

14. In a lawn maintenance machine, the combination of a wheeled carriage, a cutting blade rotatably mounted on said carriage to turn about a substantially vertical axis, means for rotating said cutting blade, said carriage including a housing having a top wall spaced above said cutting blade and a generally vertically extending wall depending from said top wall and encompassing the path of travel of the tip of said blade, said housing having in one wall thereof a plurality of openings forming a grading section, said cutting blade having a configuration adapted to create upon rotation of said blade an updraft of air into the housing substantially centrally of said housing to draw material to be comminuted upwardly into the housing and into the cutting zone of said blade, and a flange carried by said housing and projecting inwardly toward said axis of rotation of said blade at a level below said blade to intercept currents of air descending adjacent the interior surface of said vertical wall and to redirect said currents and material carried thereby inwardly toward said central updraft of air.

15. A lawn maintenance machine comprising a mobile housing having a top wall and a depending side wall, an air current producing cutting blade mounted for rotation about an axis substantially normal to said top wall and within said housing, said side wall having a plurality of openings therein, and said side wall having an inwardly extending ledge on a lower portion thereof, whereby material cut and picked up by said blade will be circulated within said housing and finally discharged through said openings.

References Cited in the file of this patent

UNITED STATES PATENTS

| | | |
|---|---|---|
| 2,242,922 | Poynter | May 20, 1941 |
| 2,491,544 | Arkenberg | Dec. 20, 1949 |

FOREIGN PATENTS

| | | |
|---|---|---|
| 566,318 | Great Britain | Dec. 21, 1944 |